(12) United States Patent
Berkey et al.

(10) Patent No.: US 11,970,297 B2
(45) Date of Patent: Apr. 30, 2024

(54) SYSTEM, DEVICE AND METHOD TO FACILITATE TYING A KNOT

(71) Applicant: The Boeing Company, Chicago, IL (US)

(72) Inventors: Tyler E. Berkey, Charleston, SC (US); Daniel Thomas, Summerville, SC (US); Matthew L. Scott, Charleston, SC (US)

(73) Assignee: THE BOEING COMPANY, Chicago, IL (US)

( * ) Notice: Subject to any disclaimer, the term of this patent is extended or adjusted under 35 U.S.C. 154(b) by 827 days.

(21) Appl. No.: 16/223,949

(22) Filed: Dec. 18, 2018

(65) Prior Publication Data
US 2020/0189775 A1 Jun. 18, 2020

(51) Int. Cl.
B65B 13/26 (2006.01)
B65B 27/10 (2006.01)
B65H 69/04 (2006.01)

(52) U.S. Cl.
CPC ............ B65B 13/265 (2013.01); B65B 27/10 (2013.01); B65H 69/043 (2013.01)

(58) Field of Classification Search
CPC ....... B65B 27/10; B65B 13/265; B65B 13/26; B65H 69/043
USPC .......................................................... 289/17
See application file for complete search history.

(56) References Cited

U.S. PATENT DOCUMENTS

| | | | |
|---|---|---|---|
| 876,573 A | 1/1908 | Myers | |
| 3,057,648 A * | 10/1962 | Schwarze | B65B 13/265 289/17 |
| 4,558,894 A | 12/1985 | Detterbeck et al. | |
| 6,279,970 B1 | 8/2001 | Torres | |
| 6,419,283 B1 | 7/2002 | Thomas et al. | |
| 6,648,378 B1 | 11/2003 | Torres et al. | |

(Continued)

FOREIGN PATENT DOCUMENTS

| | | |
|---|---|---|
| GB | 1 562 333 | 3/1980 |
| JP | S52103296 | 8/1977 |
| JP | S53106377 | 8/1978 |

OTHER PUBLICATIONS

He, L. et al., "A Robotic knot-tying Platform for High-Trellis Hop Twining" Center for Precision and Automated Agricultural Systems, (2009), 6 pages.

(Continued)

Primary Examiner — Nathan E Durham
Assistant Examiner — Abby M Spatz
(74) Attorney, Agent, or Firm — ALSTON & BIRD LLP

(57) ABSTRACT

A system, device and method to facilitate tying a knot are provided. In the context of a device, the device includes a fixture defining an internal passage therethrough. The fixture defines a circumferential groove opening through an interior surface of the fixture and into the internal passage. The groove includes first and second groove portions that cross one another. Opposite ends of the groove are coincident and open through an exterior surface of the fixture. With relation to a system, the system includes a fixture and a lead member supply mechanism configured to alternately feed a lead member through the groove and to withdraw the lead member from the groove once the tie member is connected thereto.

17 Claims, 9 Drawing Sheets

(56) References Cited

U.S. PATENT DOCUMENTS

| | | | | |
|---|---|---|---|---|
| 8,573,656 B1 * | 11/2013 | Zhang | .................... | A01G 17/08 |
| | | | | 289/2 |
| 8,622,440 B2 | 1/2014 | Chrichton et al. | | |
| 2008/0282645 A1 * | 11/2008 | Beardsall | .................. | B65B 7/02 |
| | | | | 53/138.7 |
| 2018/0178934 A1 | 6/2018 | Buckthal et al. | | |
| 2018/0229870 A1 * | 8/2018 | Diaz Cruz | ........... | B65H 69/043 |

OTHER PUBLICATIONS

Extended European Search Report for EP Application No. 19212691.0 dated Mar. 31, 2020, 10 pages.
European Examination Report for EP Application No. 19212691.0 dated Mar. 31, 2021, 7 pages.
Translation of the Office Action for Japanese Application No. 2019-206254 dated Jun. 12, 2023, 6 pages.

* cited by examiner

SYSTEM, DEVICE AND METHOD TO FACILITATE TYING A KNOT

TECHNOLOGICAL FIELD

An example embodiment relates generally to a technique for tying a knot and, more particularly, to a system, a device and a method to facilitate tying a knot.

BACKGROUND

Wire bundles, such as groups of wires, cables, conduits or other elongate members, are frequently secured together, such as at generally regular intervals, in order to facilitate proper wire bundle management. By securing a wire bundle at generally regular intervals, the wire bundle can be more readily maintained in a desired position as to avoid interference with other components and to reduce the risk that the wire bundle will be damaged. For example, vehicles, such as automobiles, aircraft or the like, oftentimes include wire bundles with the wire bundles secured at generally regular intervals. For example, the wire bundles of commercial aircraft are generally secured at regular intervals of every one to three feet. With respect to military aircraft, the wire bundles are generally secured at more frequent intervals, such as every two to three inches.

Cable ties, such as zip ties, are sometimes used in order to secure a wire bundle. However, zip ties and other types of cable ties disadvantageously add to the weight of the system that includes the wire bundle. Some systems, such as aircraft, may include long lengths of wire bundles and, as a result, may include many cable ties which, in the aggregate, contribute to the overall weight of the system. With respect to an aircraft, for example, the increase in weight due to the cable ties, such as zip ties, may increase fuel consumption, decrease range and the like.

As such, string may be utilized in order to tie a wire bundle so as to secure the wire bundle at generally regular intervals. In this regard, a wire bundle may be tied with a clove hitch knot that provides for the secure retention of the wire bundle even as a system that includes the wire bundle, such as an aircraft, experiences various external forces. A knot, such as a clove hitch knot, is generally lighter than a zip tie or other cable tie, thereby reducing the overall weight of the system including the wire bundle. With respect to an aircraft, for example, this reduction in weight may reduce fuel consumption, increase range or the like. However, some knots, such as clove hitch knots, may be difficult to tie, at least on a repeated basis. Even if properly tied, some knots, such as clove hitch knots, may be time consuming to tie, thereby increasing assembly time and cost for the overall system.

BRIEF SUMMARY

A system, device and method are therefore provided in accordance with an example embodiment in order to facilitate tying of a knot, such as a clove hitch knot. A knot tied with assistance by the system, device and method of an example embodiment may be utilized to secure various workpieces including wire bundles, such as a wire bundle carried by vehicles, such as automobiles, aircraft or the like. By facilitating the tying of a knot, such as a clove hitch knot, the system, device and method of an example embodiment permit knots to be tied in a reliable manner and to be tied more expeditiously, thereby potentially reducing installation time and cost. Additionally, by facilitating the tying of knots, the system, device and method of an example embodiment permit a workpiece, such as a wire bundle, to be secured with a string, as opposed to a zip tie or other cable tie, thereby reducing the overall weight and potentially reducing fuel consumption and increasing range relative to the use of cable ties.

In an example embodiment, a device is provided to facilitate tying a knot. The device includes a fixture defining an internal passage therethrough. The fixture defines a circumferential groove accessible through an interior surface of the fixture and in communication with the internal passage. The groove includes first and second groove portions that cross one another. Opposite ends of the groove are coincident and open through an opening defined by an exterior surface of the fixture.

The groove of an example embodiment further includes a third groove portion parallel to the first groove portion. The second and third groove portions cross one another, and the first, second and third groove portions are disposed sequentially between the opposite ends of the groove. In an example embodiment, the first and second groove portions have different depths. The groove of an example embodiment includes a channel and a neck extending between the channel and the interior surface of the fixture. The neck has a smaller width than the channel. In an example embodiment, the fixture includes first and second fixture components that cooperate to define the first and second groove portions of the groove. The first fixture component defines the first and second groove portions to cross one another and the second fixture component defines the first and second groove portions to have a parallel relationship.

In another example embodiment, a system is provided to facilitate tying a knot. The system includes a fixture defining an internal passage therethrough. The fixture defines a circumferential groove accessible through an interior surface of the fixture and in communication with the internal passage. The groove includes first and second groove portions that cross one another. The system also includes a lead member supply mechanism configured to alternately feed a lead member through the groove and to withdraw the lead member from the groove once a tie member is connected thereto.

The lead member supply mechanism of an example embodiment is configured to feed the lead member through the groove by pushing the lead member lengthwise through the groove in a first direction and to withdraw the lead member from the groove by retracting the lead member from the groove such that the tie member is pulled through the groove in a second direction, opposite the first direction. In an example embodiment, opposite ends of the groove are coincident and open through an opening defined through an exterior surface of the fixture. The lead member supply mechanism of this example embodiment is configured to feed the lead member through the groove by inserting the lead member through the opening and into the groove and to withdraw the lead member from the groove by withdrawing the lead member through the opening.

The lead member supply mechanism of an example embodiment includes a supply of the lead member and one or more feed members configured to engage the lead member and to alternately feed the lead member to and withdraw the lead member from the groove. The system of this example embodiment may also include a supply of the tie member; and a housing that engages and positionally maintains the fixture, supplies of the lead member and the tie member and the one or more rotatable feed wheels.

The groove of an example embodiment further includes a third groove portion parallel to the first groove portion with the second and third groove portions crossing one another. The first, second and third groove portions of this example embodiment are disposed sequentially between the opposite ends of the groove. In an example embodiment, the first and second groove portions have different depths. The groove of an example embodiment includes a channel and a neck extending between the channel and the interior surface of the fixture. The neck of this example embodiment has a smaller width than the channel. In an example embodiment, the fixture includes first and second fixture components that cooperate to define the first and second groove portions of the groove. In this example embodiment, the first fixture component defines the first and second groove portions to cross one another and the second fixture component defines the first and second groove portions to have a parallel relationship.

In a further example embodiment, a method is provided to facilitate tying a knot. The method includes positioning a fixture about a workpiece such that the workpiece extends through an internal passage defined by the fixture. The fixture defines a circumferential groove accessible through an interior surface of the fixture and in communication with the internal passage. The groove includes first and second groove portions that cross one another. The method also includes inserting a tie member through the groove such that the tie member extends lengthwise through the groove. The method further includes forcing the tie member to move inward toward the workpiece and out of the groove and removing the fixture from the workpiece to permit the knot to be formed from the tie member.

The method of an example embodiment inserts the tie member through the groove by feeding a lead member through the groove, connecting the tie member to the lead member and withdrawing the lead member from the groove such that the tie member is correspondingly inserted through the groove. In one embodiment, the method feeds the lead member through the groove by pushing the lead member lengthwise through the groove in a first direction, and the method also withdraws the lead member by retracting the lead member from the groove such that the tie member is pulled through the groove in a second direction, opposite the first direction. In another embodiment, the method feeds the lead member through the groove by pushing the lead member lengthwise through the groove in a first direction, and the method also withdraws the lead member by pulling the lead member from the groove such that the tie member connected to the lead member is also pulled through the groove in the first direction.

The first and second groove portions of an example embodiment have different depths such that the lead member that extends through one of the first or second groove portions is inward of and crosses the lead member that extends through another of the first or second groove portions. In an example embodiment, the groove includes a channel and a neck extending between the channel and an interior surface of the fixture that faces the workpiece. In an example embodiment in which the neck has a smaller width than the channel, the method inserts the tie member through the groove by inserting the tie member through the channel of the groove, and the method also forces the tie member to move inward toward the workpiece and out of the groove by forcing the tie member from the channel and through the neck of the groove so as to move out of move out of the groove.

BRIEF DESCRIPTION OF THE DRAWINGS

Figure 1:
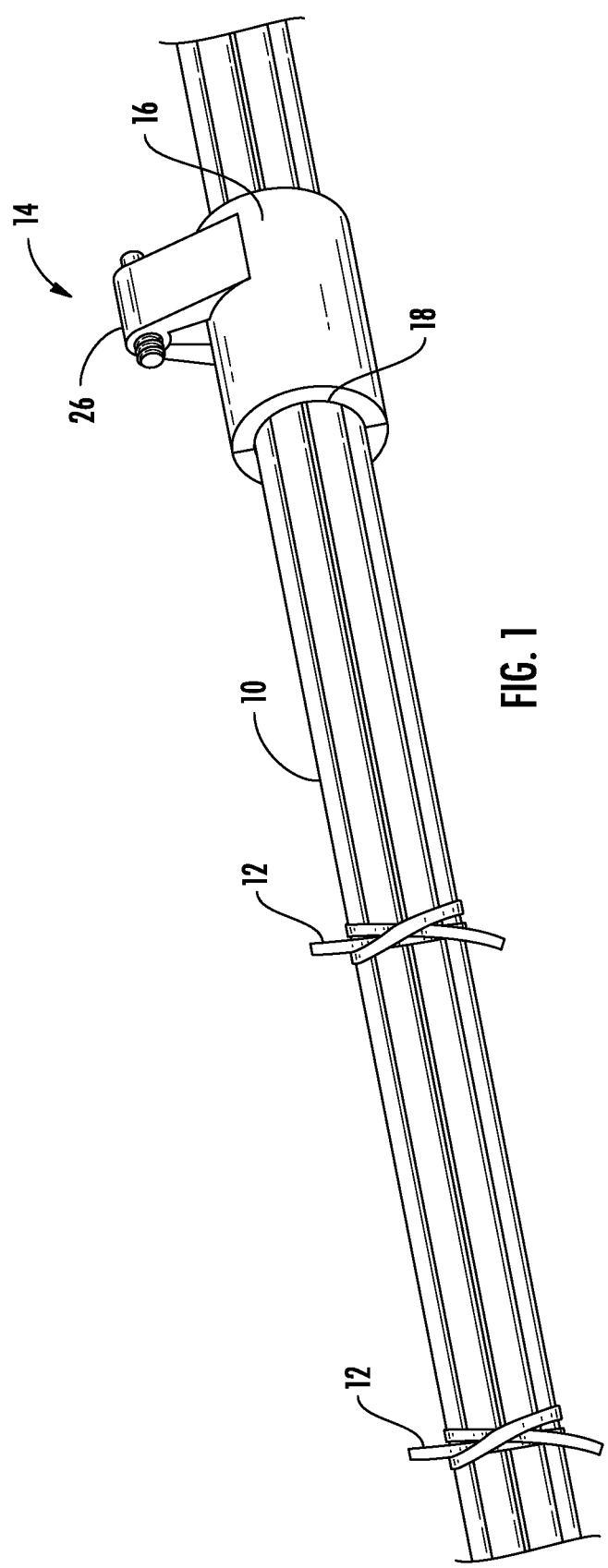
Figure 2A:
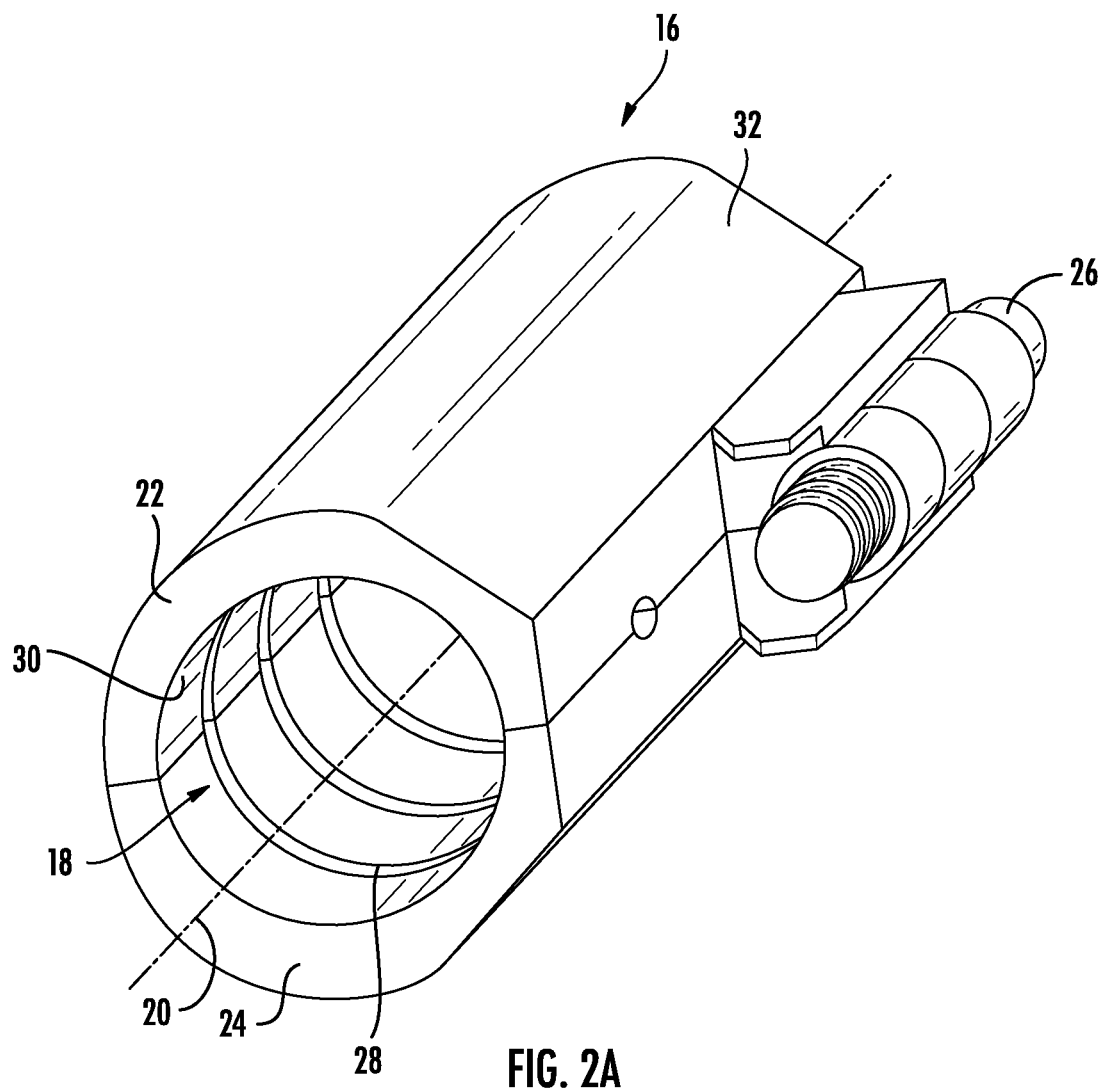
Figure 2B:
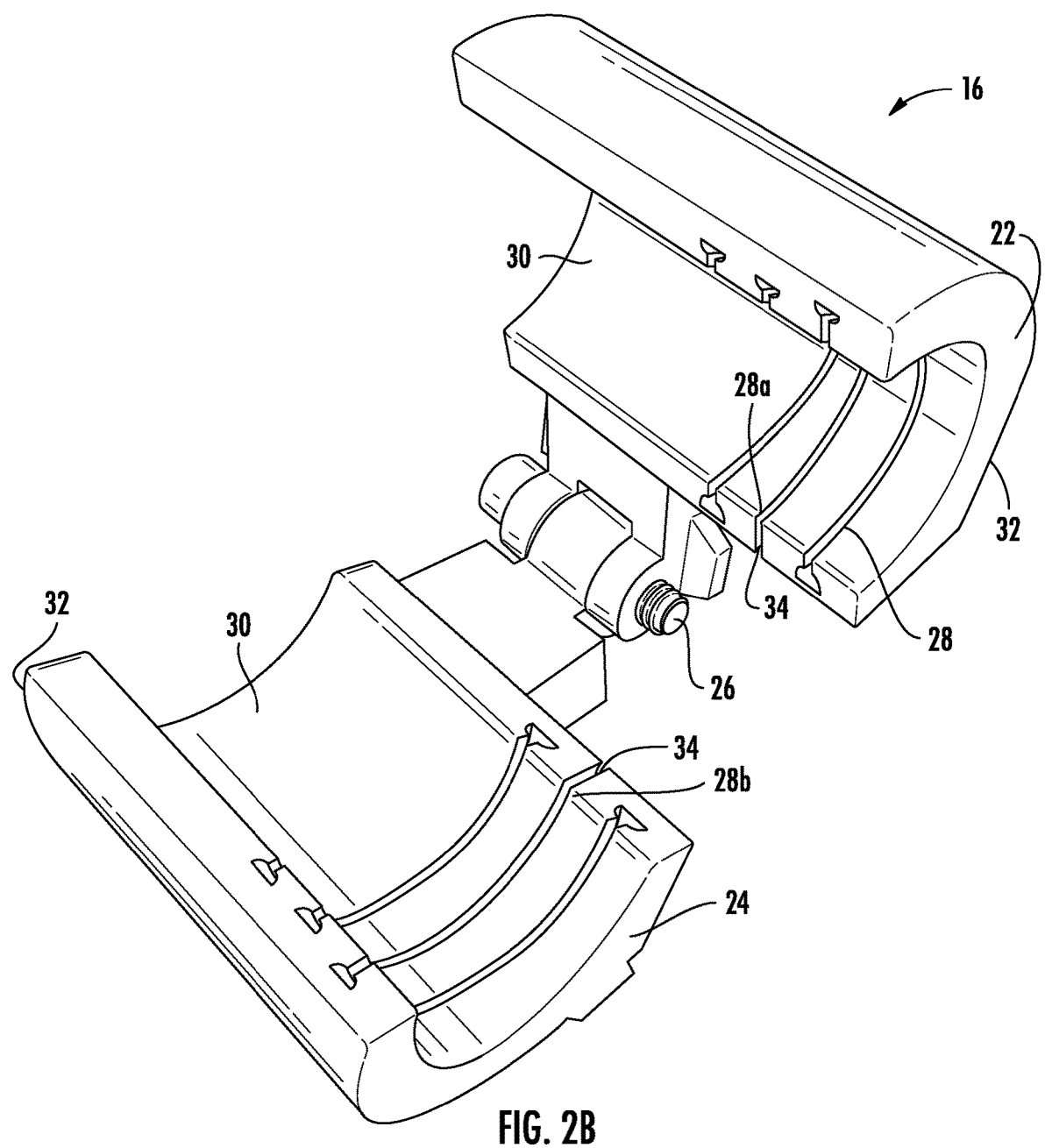
Figure 3:
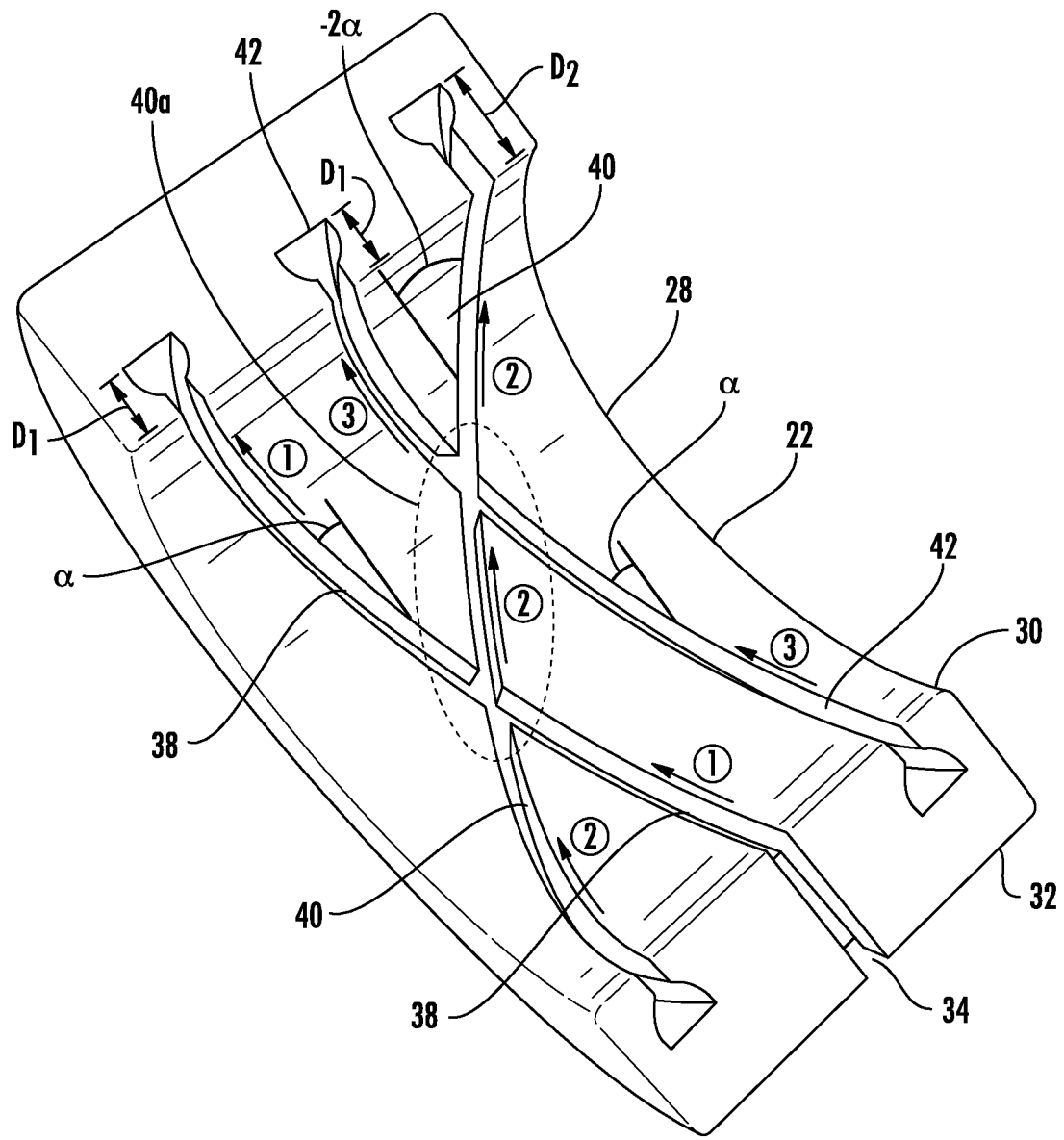
Figure 4:
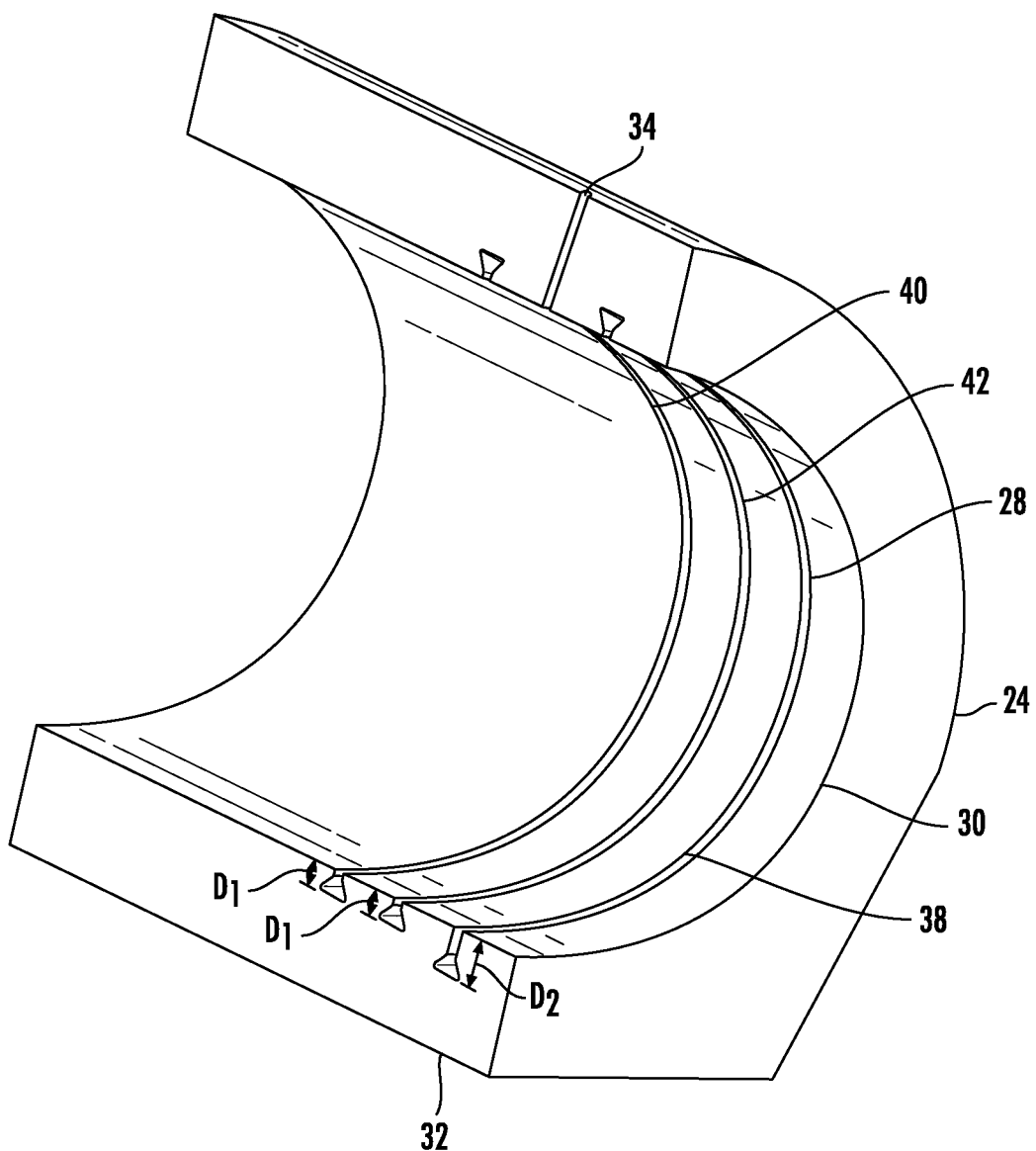
Figure 5:
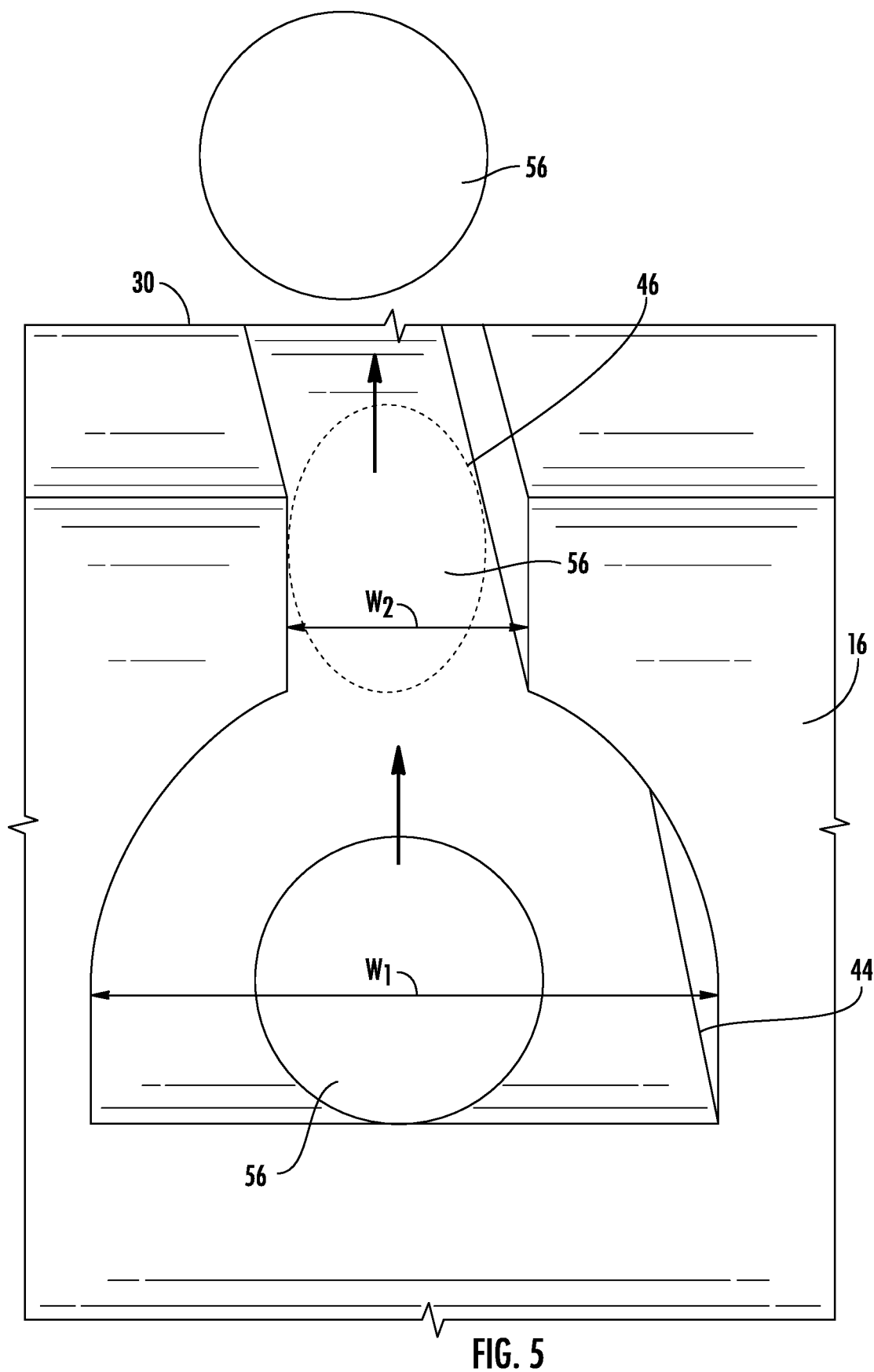
Figure 6:
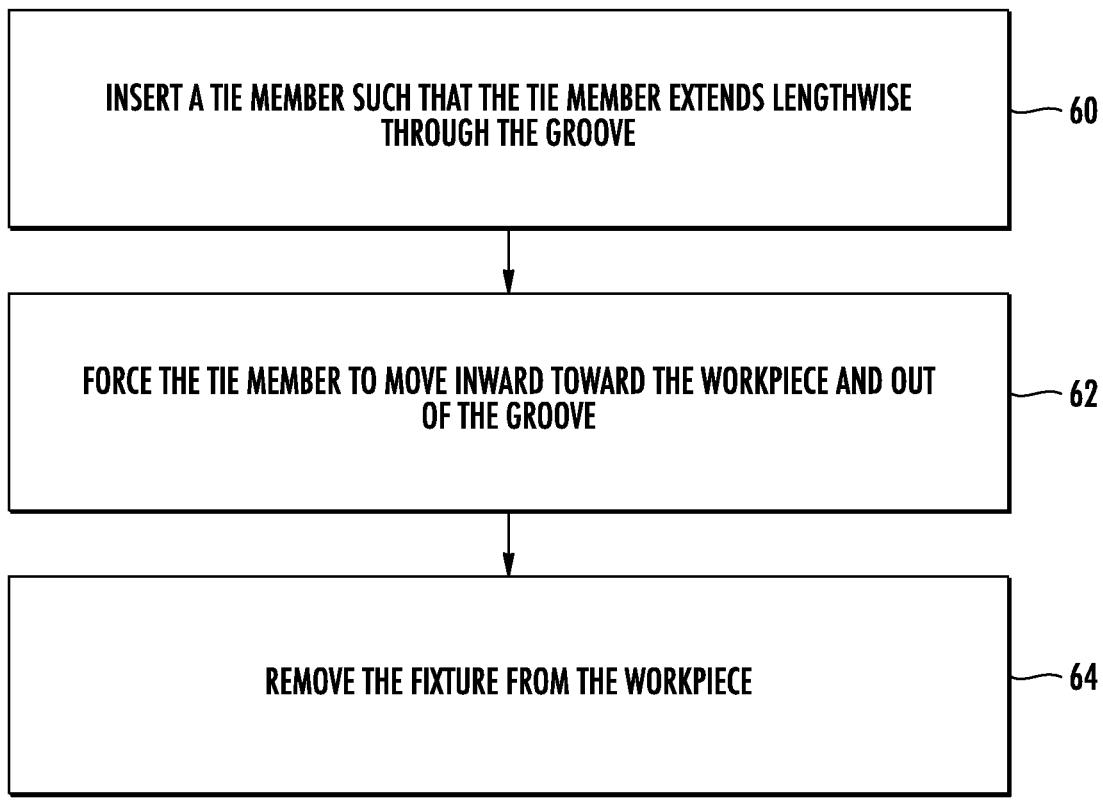
Figure 7:
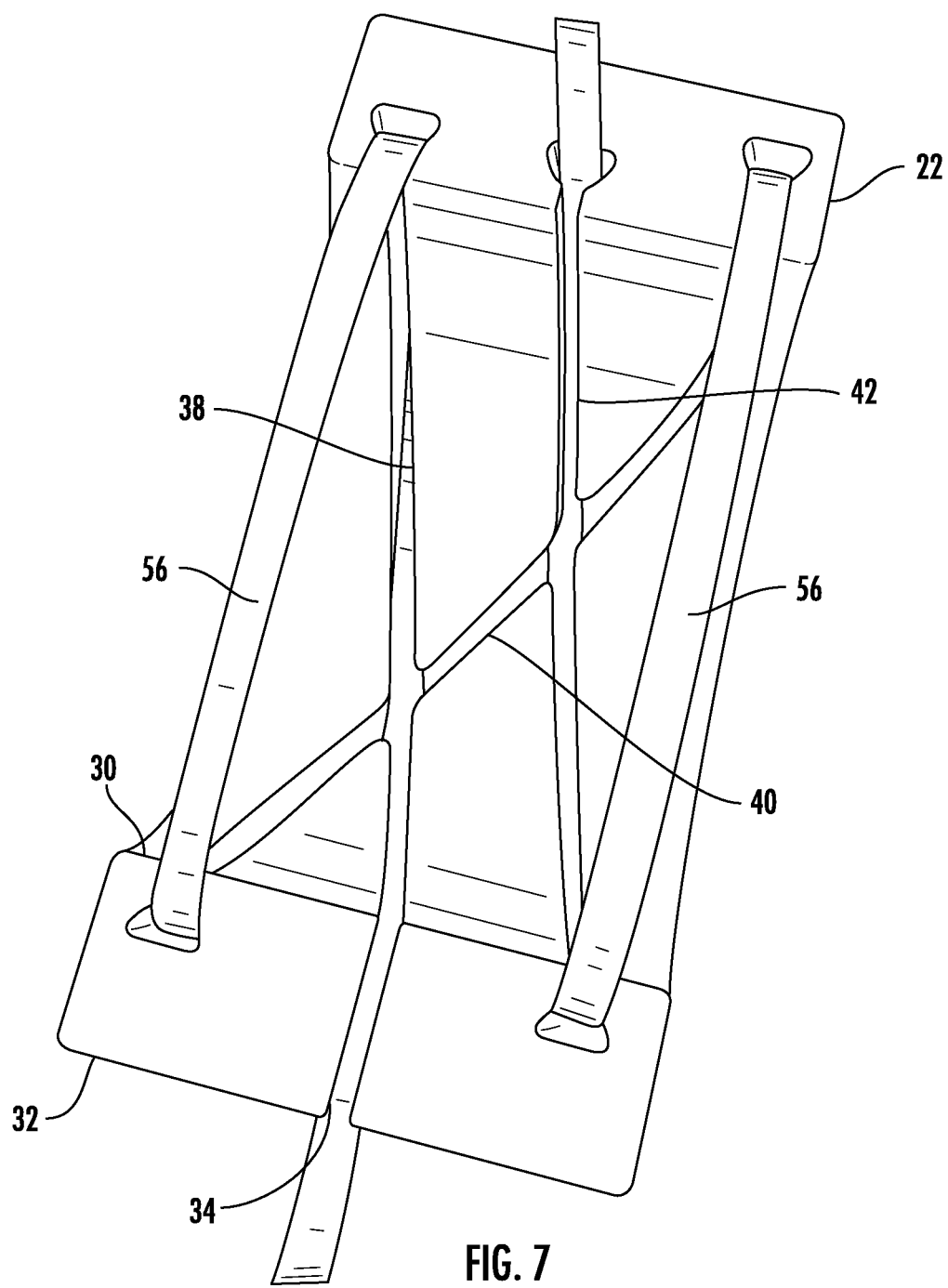
Figure 8:
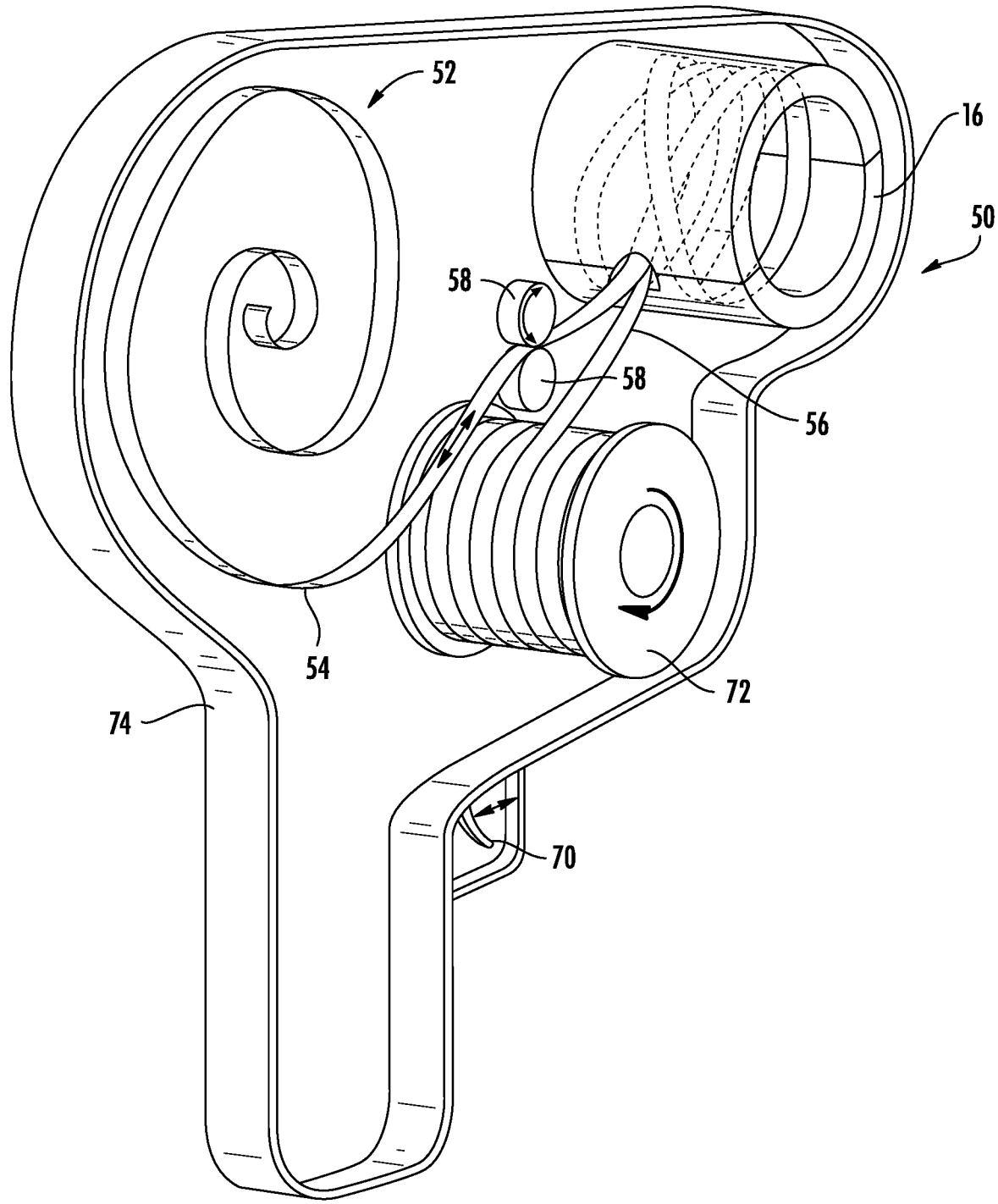

Having thus described example embodiments of the disclosure in general terms, reference will now be made to the accompanying drawings, which are not necessarily drawn to scale, and wherein:

FIG. 1 is a perspective view of wire bundle secured by two clove hitch knots which also illustrates a device through which the wire bundle extends to facilitate tying a third knot about the wire bundle in accordance with an example embodiment of the present disclosure;

FIGS. 2A and 2B are perspective views of a fixture in a closed position and an open position, respectively, in accordance with an example embodiment of the present disclosure;

FIG. 3 is a perspective view of a first fixture component having first, second and third groove portions with the first and third groove portions crossing the second groove portion in accordance with an example embodiment of the present disclosure;

FIG. 4 is a perspective view of the second fixture component having first, second and third groove portions extending parallel therethrough in accordance with an example embodiment of the present disclosure;

FIG. 5 is a side view of a groove that illustrates the channel and the neck in more detail in accordance with an example embodiment of the present disclosure;

FIG. 6 is a flowchart illustrating the operations performed in order to facilitate tying a knot, such as a clove hitch knot, in accordance with an example embodiment of the present disclosure;

FIG. 7 is a perspective view of the first fixture component of FIG. 3 in which a tie member has been inserted through the groove in accordance with an example embodiment of the present disclosure; and FIG. 8 is a perspective view of a system in accordance with an example embodiment in which a portion of the housing has been removed in order to illustrate the fixture, the supplies of a lead member and the tie member and the one or more rotatable feed members in accordance with an example embodiment of the present disclosure.

DETAILED DESCRIPTION

Some example embodiments of the present disclosure will now be described more fully hereinafter with reference to the accompanying drawings, in which some, but not all embodiments of the disclosure are shown. Indeed, various embodiments of the disclosure may be embodied in many different forms and should not be construed as limited to the embodiments set forth herein; rather, these example embodiments are provided so that this disclosure will be thorough and complete, and will fully convey the scope of the disclosure to those skilled in the art. Like reference numerals refer to like elements throughout.

A system, device and method are provided in accordance with an example embodiment in order to facilitate tying a knot, such as a clove hitch knot. The system, device and method facilitate tying a knot with a string about a workpiece. Knots may be tied about a variety of workpieces so as to secure the respective workpieces. In an example embodiment, the workpiece is a wire bundle, such as a bundle of wires, cables, conduits or other elongate members. The workpiece, such as a wire bundle, secured by the knots may be employed in a variety of different applications. For example, a wire bundle secured by one or more knots may extend through a vehicle, such as an automobile, an aircraft, a space vehicle or the like, in order to interconnect various components of the vehicle.

Referring now to FIG. 1, an elongate workpiece 10, such as a wire bundle, is depicted. The workpiece 10 is secured at generally regular intervals by a string in which a knot 12, such as a clove hitch knot, is formed. With respect to the example of FIG. 1, two knots 12 are depicted at locations spaced apart along the elongate workpiece 10, such as the elongate wire bundle. While the workpiece 10 of FIG. 1 is depicted to be secured by a plurality of knots 12 at regular intervals therealong, the workpiece may be secured by any number of knots with the knots being spaced at either regular or irregular intervals.

As also shown in FIG. 1, a device 14 in accordance with an example embodiment has engaged the workpiece 10 in order to facilitate tying another knot 12 about the workpiece. The device 14 includes a fixture 16. As shown in FIG. 1 and in more detail in FIG. 2A, the fixture 16 defines an internal passage 18 centered about a longitudinal axis 20 extending through the internal passage. The internal passage 18 is sized to receive the workpiece 10, such as a wire bundle, such that the workpiece extends through the internal passage defined by the fixture 16.

The fixture 16 of an example embodiment includes first and second fixture components 22, 24. The fixture 16 may have a clamshell design so as to alternately open and close about a workpiece 10, such as a wire bundle. As shown in FIGS. 2A and 2B, for example, the first and second fixture components 22, 24 may be pivotably joined, such as by being mounted on a hinge 26 about which the first and second fixture components rotate. However, the first and second fixture components 22, 24 need not be pivotably joined so as to alternately open and close about a workpiece 10 and may, instead, be differently configured while still permitting the first and second fixture components to alternately be positioned about a workpiece as shown in FIG. 1 and then removed and separately from the workpiece.

The fixture 16 also defines a circumferential groove 28 opening through an interior surface 30 of the fixture and into the internal passage 18. The circumferential groove 28 extends lengthwise and continuously between opposed ends 28a, 28b, as shown in FIG. 2B. In an example embodiment of the first fixture component 22 depicted in FIG. 3, the opposite ends 28a, 28b of the groove 28 are coincident and open through an exterior surface 32 of the fixture 16. In the illustrated embodiment in which an opening 34 is defined adjacent one end of the first fixture component 22, the portion of the second fixture component 24 that is aligned with and adjacent to the opening may also define a portion of the opening such that the portions of the opening defined by the first and second fixture components cooperate to comprise the opening. Thus, the fixture 16 of this example embodiment also defines an opening 34 through the exterior surface 32 that serves as both of the opposed ends 28a, 28b of the circumferential groove 28 defined by the fixture. The portions of the opening 34 defined by the first and second fixture components 22, 24 may be aligned as illustrated. Or, the portions of the opening 34 defined by the first and second fixture components 22, 24 may be offset from one another with the portion of the opening defined by one fixture component serving as one end 28a of the circumferential groove 28 and the portion of the opening defined by the other fixture component serving as the other end 28b of the circumferential groove. The groove 28 may transition to the opening 34 in various manners, but, in one embodiment, the groove smoothly curves to the opening.

The circumferential groove 28 defined by the fixture 16 extends circumferentially at least twice and, in some embodiments, three or more times about the internal passage 18 defined by the fixture. In the illustrated embodiment, for example, the circumferential groove 28 extends three times about the internal passage 18 defined by the fixture 16. The circumferential groove 28 therefore includes a plurality of groove portions, each of which extends once, that is, 360°, about the internal passage 18 defined by the fixture 16. The plurality of groove portions are disposed sequentially such that in the illustrated embodiment in which the circumferential groove 28 extends three times about the internal passage 18 defined by the fixture 16, the circumferential groove includes three groove portions, namely, a first groove portion 38 that extends from the opening 34 defined through the exterior surface 32 of the fixture 360° about the internal passage defined by the fixture to the second groove portion 40. The second groove portion 40 then also extends 360° about the internal passage to the third groove portion 42. The third groove portion 42 then extends from the second groove portion 40 360° about the internal passage 18 defined by the fixture 16 to the opening 34 through the exterior surface 32 of the fixture. In the embodiment in which the fixture 16 includes first and second fixture components 22, 24, each groove portion is defined by each of the first and second fixture components such that the first and second fixture components cooperate to define the circumferential groove 28 in general and, more particularly, each of the first, second and third groove portions 38, 40, 42.

In order to facilitate tying a knot 12, the first and second groove portions 38, 40 are defined by the fixture 16 and, more particularly, the first fixture component 22 so as to cross one another. In the embodiment in which the circumferential groove 28 includes first, second and third groove portions, the second and third groove portions 40, 42 may also be defined so as to cross one another. In this example embodiment, the first and third groove portions 38, 42 may be defined so as to be parallel to one another with the second groove portion 40 being defined so as to extend at an angle to both the first and third groove portions such that the second groove portion crosses both the first and third groove portions.

In an example embodiment of FIG. 4, the second fixture component 24 defines the groove portions, such as the first, second and third groove portions 38, 40, 42, so as to be parallel to one another. As such, each of the first, second and third groove portions 38, 40, 42 lie in respective reference planes that are parallel to one another and are oriented perpendicular to the longitudinal axis 20 defined by the internal passage 18 through the fixture 16. In contrast, the first fixture component 22 defines the groove portions and, in the illustrated embodiment, the first, second and third groove portions 38, 40, 42 so as to lie in respective reference planes that are differently oriented relative to the longitudinal axis 20. In this regard and as described above, the first and third groove portions 38, 42 are parallel to one another and lie in respective planes that are parallel to one another and are offset in a first angular direction from a plane perpendicular to the longitudinal axis 20 by a predefined angle α as shown in FIG. 3. In contrast, the second groove portion 40 lies in a reference plane that is offset in a second angular direction, opposite from the first angular direction, from the plane perpendicular to the longitudinal axis 20. The reference plane that contains the second groove portion 40 may not only be offset from the plane perpendicular to the longitudinal axis 20 in a different angular direction, but may also be offset to a greater degree, such as by being offset from the plane perpendicular to the longitudinal axis by twice the angle (−2α) at which the reference planes that contain the first and third groove portions are offset from the plane perpendicular to the longitudinal axis.

As indicated by the arrows designated 1 in FIG. 3, the circumferential groove 28 of the illustrated embodiment begins with the first groove portion 38 that extends from the opening 34 extending through the exterior surface 32 of the fixture 16 at an angle, such as θ, relative to a plane perpendicular to the longitudinal axis 20 about the first fixture component 22. The first groove portion 38 then continues through the second fixture component 24 about the remainder of the internal passage 18. The first groove portion 38 defined by the second fixture component 24 is at a different angle, such as 0°, with respect to the plane perpendicular to the longitudinal axis 20 (by lying, for example, in the plane perpendicular to the longitudinal axis) than the first groove portion defined by the first fixture component 22. As indicated by the arrows designated 2 in FIG. 3, the circumferential groove 28 then continues with the second groove portion 40 being defined by the first fixture component 22 at a different angle, such as an angle of −2θ, relative to a plane perpendicular to the longitudinal axis 20 than the first groove portion 38. The second groove portion 40 then continues through the second fixture component 24 about the remainder of the internal passage 18. Like the first groove portion 38, the second groove portion 40 defined by the second fixture component 24 is at a different angle, such as 0°, with respect to the plane perpendicular to the longitudinal axis 20 (by lying, for example, in the plane perpendicular to the longitudinal axis) than the second groove portion defined by the first fixture component 22. As indicated by the arrows designated 3 in FIG. 3, the third groove portion 42 then continues from the second groove portion 40 at an angle, such as θ, relative to a plane perpendicular to the longitudinal axis 20 about the first fixture component 22. The third groove portion 42 then continues through the second fixture component 24 about the remainder of the internal passage 18 to the opening 34 defined through the exterior surface 32 of the fixture 16. Like the first and second groove portions 38, 40, the third groove portion 42 defined by the second fixture component 24 is at a different angle, such as 0°, with respect to the plane perpendicular to the longitudinal axis 20 (by lying, for example, in the plane perpendicular to the longitudinal axis) than the third groove portion defined by the first fixture component 22. Thus, the circumferential groove 28 comprised of the first, second and third groove portions 38, 40, 42 begins at the opening 34 defined through the exterior surface 32 of the fixture 16 and extends continuously in a lengthwise direction three times about the internal passage 18 before ending at the same opening through the exterior surface of the fixture.

The circumferential groove 28 may have various configurations and shapes. In an example embodiment shown in more detail in FIG. 5, however, the circumferential groove 28 includes a channel 44 and a neck 46 extending between the channel and the interior surface 30 of the fixture 16. The neck 46 has a smaller width $W_2$ than the width $W_1$ of the channel 44, as measured in a widthwise direction perpendicular to the lengthwise direction in which the groove extends. As such, a tie member may be disposed within the channel 44 and while the tie member may be forced through the neck 46 of the groove 28, the tie member will otherwise be retained within the channel in the absence of a force causing the tie member to move from the channel, through the neck and into the internal passage 18.

Although the fixture 16 may be formed in various manners, the fixture of an example embodiment may be additively manufactured or laser printed. In order to facilitate laser printing of a fixture without support material and as a single piece, the channel 44 of an example embodiment includes angled surfaces that converge to the neck 46, such as shown in FIG. 5. In an example embodiment, a pliable member, such as a rubber gasket or a plurality of bristles, is positioned and held within the neck 46 of the circumferential groove 28 so as to extend into the passageway defined by the neck. The pliable member further biases a tie member to remain within the channel 44 and prevents inadvertent removal of the tie member from the channel while still permitting the tie member to be extracted through the neck 46 from the channel upon the application of an external force to the tie member as described below.

In an example embodiment, the first and second groove portions 38, 40 have different depths as measured relative to the interior surface 30 of the fixture 16. In an embodiment that includes first, second and third groove portions, the first and third groove portions 38, 42 may have the same depth $D_1$ and the second groove portion 40 may have a different depth $D_2$ than either the first or third groove portions. In this example embodiment, the second groove portion 40 has a greater depth $D_2$ than the depth $D_1$ of the first and third groove portions 38, 42, thereby extending further into the fixture 16 from the interior surface 30 thereof. Although the entirety of the second groove portion 40 may have a greater depth than the first and third groove portions 38, 42, the fixture 16 of an example embodiment is configured such that the part of the second groove portion that crosses the first and third groove portions (namely, the part of the second groove portion circled at 40a in FIG. 3) is deeper than the corresponding parts of the first and third groove portions, but the other parts of the first, second and third groove portions may have the same depth. In the illustrated embodiment, for example, the first fixture component 22 defines the second groove portion 40 to have a greater depth than the first and third groove portions 38, 42 defined by the first fixture component, while the second fixture component 24 defines the second groove portion to have the same depth as the first and third groove portions.

The fixture 16 permits a knot 12, such as a clove hitch knot, to be tied about a workpiece 10, such as a wire bundle. As shown in block 60 of FIG. 6 and after having positioned the fixture 16 about a workpiece 10 such that the workpiece extends through the internal passage 18 defined by the fixture, a tie member, such as a string, is inserted through the groove 28 such that the tie member extends lengthwise through the groove. In this regard and as shown in FIG. 7 in which the second fixture component 24 has been removed to permit the tie member 56 passing through the sequential groove portions to be seen, the tie member may be inserted through the opening 34 defined through the exterior surface 32 of the fixture 16 and into the first groove portion 38 and, more particularly, the channel 44 of the first groove portion. The insertion of the tie member 56 continues through the first groove portion 38 (as indicated by the arrows designated 1 in FIG. 3) and into the second groove portion 40 (as indicated by the arrows designated 2) and, in turn, the third groove portion 42 (as indicated by the arrows designated 3) prior to emerging from the fixture 16 through the opening 34 defined through the exterior surface 32 of the fixture. As a result of the different depths of the groove portions, such as the deeper depth of the second groove portion 40 relative to the first and third groove portions 38, 42, the tie member 56 can extend sequentially through the first, second and third groove portions and can cross over itself as a result of the manner in which the second groove portion crosses the first and second groove portions.

As shown in block 62 of FIG. 6, the tie member is then forced to move inward toward the workpiece 10 and out of the groove 28. In this regard, the tie member is forced to move through the neck 46 of the circumferential groove 28 and into the internal passage 18 defined by the fixture 16 so as to be in closer proximity to and, in some embodiments, in contact with the workpiece 10, such as a wire bundle, extending therethrough. The tie member is forced out of the groove 28 in one example embodiment by applying a pulling force to the portions of the tie member that extend outward from the opening 34 defined by the exterior surface 32 of the fixture 16. For example, the portions of the tie member that extend through the opening 34 defined by the exterior surface 32 of the fixture 16 may be pulled in a direction away from the fixture or in other directions that tend to pull the tie member out of the opening defined by the exterior surface of the fixture. The application of this force to the tie member 56 causes the length of tie member within the fixture 16 that is extends through the circumferential groove 28 to shorten and be pulled through the neck 46 of the groove, thereby cinching about the workpiece, such as the wire bundle, as illustrated in FIG. 5. The fixture 16 may then be removed from the workpiece 10 as shown in block 64, such as by opening the first and second fixture components 22, 24. The opposed portions, such as the end portions, of the tie member are pulled through the opening 34 defined by the exterior surface 32 of the fixture 16 as the fixture is removed from the workpiece 10 such that the tie member remains wrapped about the workpiece, such as the wire bundle, in the configuration defined by the circumferential groove 28. The ends of the tie member may then be tied, such as in a double knot, thereby resulting in a knot 12, such as a clove hitch knot as a result of the pattern defined by the circumferential groove 28.

The tie member may be inserted through the circumferential groove 28 by hand, such as by pushing the tie member through the circumferential groove. In order to facilitate the insertion of the tie member, a lead member may initially be inserted through the groove 28, such as by being pushed through the groove. While sufficiently flexible to follow the circumferential groove 28 about the internal passage 18, the lead member is more rigid than the tie member. For example, the lead member may be formed of a metal, such as spring steel, and may be in the form of a flat ribbon. A first end of the lead member may be inserted into the groove 28 and the tie member may be attached, such as by a clip, to an opposed second end of the lead member. The lead member may then be inserted in a first direction through the groove. Once the lead member emerges from the opening 34 defined by the exterior surface 32 of the fixture 16 after having passed through the circumferential groove 28, the first end of the lead member may be pulled such that the lead member is pulled lengthwise in a first direction from the groove while the tie member attached to the lead member is correspondingly pulled in the first direction into the groove. Once the lead member is removed from the groove 28 and the tie member has been correspondingly inserted into the groove, the tie member may be detached from the lead member and the process of forming a knot 12 may continue as described above, such as by pulling the opposed ends of the tie member outwardly relative to the fixture 16 in order to cause the tie member to move out of the groove and to cinch about the workpiece 10, such as the wire bundle, prior to removing the fixture.

In an example embodiment, a system is provided in accordance with an example embodiment to facilitate tying a knot 12 and, more particularly, to facilitate insertion of the tie member through the circumferential groove 28. As shown in FIG. 8, the system 50 includes a fixture 16, such as described above, and a lead member supply mechanism 52. The lead member supply mechanism 52 is configured to alternately feed a lead member 54, such as a spring member, e.g., a spring steel member in the form of a flat ribbon, through the groove 28 and to withdraw the lead member from the groove once the tie member 56 is connected thereto.

In this regard, the lead member supply mechanism 52 is configured to push the lead member 54 lengthwise through the groove 28 in a first direction, such as by inserting the lead member through the opening 34 defined by the exterior surface 32 of the fixture and 16 into the circumferential groove. The lead member 54 may be extended through the entire length of the circumferential groove 28 so as to emerge from the fixture 16 through the same opening 34 defined through the exterior surface 32 thereof. In this example embodiment, the tie member 56 may then be connected to the lead member 54, such as by means of a clip, e.g., an alligator clip. The lead member supply mechanism 52 is then configured to withdraw the lead member 54 from the groove 28 by retracting the lead member from the groove such that the tie member 56 is pulled through the groove by the lead member. In this regard, the lead member supply mechanism 52 is configured to withdraw the lead member 54 from the groove 28 by withdrawing the lead member through the same opening 34 defined by the exterior surface 32 of the fixture 16 with the tie member 56 connected thereto. By withdrawing the lead member 54, the tie member 56 is correspondingly pulled through the groove 28. The tie member 56 may then be disengaged from the lead member 54 such that the opposed ends of the tie member extend through the opening 34 defined by the exterior surface 32 of the fixture 16. A force may then be applied to the opposed ends of the tie member 56 in order to force the tie member to move inward toward the workpiece 10 and out of the groove 28 prior to removing the fixture 16 from the workpiece and permitting the knot 12 having the configuration defined by the circumferential groove of the fixture to be tied. As the foregoing example illustrates, the lead member supply mechanism 52 is configured to push the lead member 54 lengthwise through the groove in a first direction (such that the lead member initially enters the third groove portion 42 prior to be pushed through the second groove portion 40 and finally the first groove portion 38) and to subsequently withdraw the lead member from the groove by retracting the lead member from the groove such that the tie member is pulled through the groove in a second direction, opposite the first direction.

As shown in FIG. 8, the lead member supply mechanism 52 may include a supply of the lead member 54, such as a coil of the lead member. As noted above, the lead member 54 may be formed, in one embodiment, by a flat spring material, such as a flat spring steel material. The lead member supply mechanism 52 of this example embodiment also includes an actuator, such as a linear actuator and, in one embodiment, one or more rotatable feed members 58, such as a pair of opposed feed wheels, configured to engage the lead member 54 and to alternately feed the lead member to and withdraw the lead member from the groove 28 defined by the fixture 16. In this regard, the feed member(s) 58 may be driven so as to controllably rotate in order to correspondingly cause the lead member to be fed to the groove 28 when rotated in a first direction or withdrawn from the groove when rotated in a second direction, opposite the first direction. Although the feed member(s) 58 may be driven in various manners, the system 50 of an example embodiment includes a trigger 70 that can be repeatedly actuated in order to controllably rotate the feed member(s). For example, the actuation of the trigger 0 may be configured to cause the feed member(s) 58 to rotate in a predefined direction by a predefined amount. By repeatedly pulling the trigger 70, the feed member(s) 58 may be repeatedly rotated, thereby providing for a ratcheting-type advancement or withdrawal of the lead member 54.

In an example embodiment, the direction in which the feed member(s) 58 rotate and, as a result, whether the lead member 54 is inserted into or withdrawn from the circumferential groove 28 may be defined by a selection mechanism (not shown) such as a toggle switch, that permits a user to alternately configure the system 50 to cause the one or more feed member(s) to rotate so as to insert the lead member into the circumferential groove or, alternately, to withdraw the lead member from the groove. In an alternative embodiment, the lead member 54 may assume a coiled position in the absence of external forces. While engaged by the one or more feed member(s) 58, the lead member 54 may be advanced through the circumferential groove 28. In order to withdraw the lead member 54 from the groove 28 in this example embodiment, the feed member(s) 58 may be configured to disengage from the lead member, such as by being raised relative to the lead member, and the lead member may then return to its coiled position, thereby withdrawing the lead member from the groove.

The system 50 of the example embodiment of FIG. 8 also includes a supply of the tie member 56, such as a spool 72 about which the tie member is wound. The spool 72 is configured to rotate, such as in a clockwise direction in the orientation of FIG. 8, in order to permit the tie member 56 to be drawn from the spool following attachment to the lead member 54 and withdrawal of the lead member through the groove 28. As also shown in FIG. 8, the system 50 can include a housing 74, one side of which has been removed to permit the other components of the system to be more clearly illustrated. The housing 74 engages and positionally maintains the fixture 16, the supplies of the lead member 54 and the tie member 56 and the one or more rotatable feed member(s) 58.

As noted above, the tie member 56 can be inserted through the circumferential groove 28 utilizing the system 50 of FIG. 8 by initially feeding the lead member 54 through the groove and then connecting the tie member 56 to the lead member, such as with a clip. The lead member 54 may then be withdrawn from the groove 28 such that the tie member 56 is correspondingly inserted into the groove, such as by being pulled through the groove by the lead member. In this example embodiment, the lead member 54 may be fed through the groove 28 by pushing the lead member lengthwise through the groove in a first direction. The lead member of this example embodiment may then be withdrawn from the groove 28 by retracting the lead member from the groove such that the tie member 56 is pulled through the groove in a second direction, opposite the first direction. The opposed portions of the tie member 56 that protrude from the opening 34 may then be cut, such as about ¼ inch beyond the fixture 16. In this regard, the system 50 of an example embodiment may also include a cutting mechanism, such as a knife blade, for cutting the opposed portions of the tie member 56 that extend beyond the fixture 56, such as in response to user actuation.

The system 50, device 14 and method of an example embodiment thereby facilitate tying a knot 12, such as a clove hitch knot, about a workpiece 10, such as a wire bundle. As such, knots 12 may be more reliably and more efficiently tied about the workpiece 10. Thus, string can be utilized to tie and secure the workpiece 10, such as the wire bundle, thereby avoiding the additional weight imposed if a comparable number of cable ties, such as zip ties, were utilized. Also, by utilizing the fixture of an example embodiment, knots, such as clove hitch knots, may be reliably tied, thereby increasing the security with which the workpiece 10 is bound.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A system to facilitate tying a knot, the system comprising:
 a fixture defining an internal passage therethrough, wherein the fixture defines a circumferential groove accessible through an interior surface of the fixture and in communication with the internal passage, wherein the circumferential groove includes first, second and third groove portions, wherein the first groove portion is parallel to the third groove portion and wherein the second groove portion crosses both the first and third groove portions, and wherein a part of the second groove portion that crosses the first and third groove portions has a different depth than the first and third groove portions, but another part of the second groove portion has a same depth as the first and third groove portions;
 a lead member supply mechanism configured to feed a lead member in a first direction through the circumferential groove such that the lead member emerges from the fixture through an opening defined by the fixture; and
 a supply of a tie member separate from the lead member supply mechanism, the tie member configured to be connected to the lead member that has been fed through the circumferential groove and emerged from the fixture,
 wherein the lead member supply mechanism is further configured to retract the lead member through the circumferential groove once the tie member is connected to the lead member such that the tie member is pulled in a second direction, opposite the first direction, through the circumferential groove by the lead member.

2. A system according to claim 1 wherein opposite ends of the circumferential groove are coincident and open through the opening defined through an exterior surface of the fixture, and wherein the lead member supply mechanism is configured to feed the lead member through the circumferential groove by inserting the lead member through the opening and into the circumferential groove and to withdraw the lead member from the circumferential groove by withdrawing the lead member through the opening.

3. A system according to claim 1 wherein the lead member supply mechanism comprises:
a supply of the lead member; and
one or more rotatable feed members configured to engage the lead member and to alternately feed the lead member to and withdraw the lead member from the circumferential groove.

4. A system according to claim 3 further comprising:
a housing that engages and positionally maintains the fixture, supplies of the lead member and the tie member and the one or more rotatable feed members.

5. A system according to claim 1 wherein the circumferential groove comprises a channel and a neck extending between the channel and the interior surface of the fixture, wherein the neck has a smaller width than the channel.

6. A system according to claim 5 further comprising a pliable member positioned within the neck.

7. A system according to claim 1 wherein the fixture comprises first and second fixture components that cooperate to define the first and second groove portions of the circumferential groove, wherein the first fixture component defines the first and second groove portions to cross one another and the second fixture component defines the first and second groove portions to have a parallel relationship.

8. A system according to claim 7 wherein the first fixture component defines the first groove portion to lie in a respective plane that is offset in a first angular direction from a plane perpendicular to a longitudinal axis about which the internal passage is centered and defines the second groove portion to lie in a respective plane that is offset in a second angular direction, opposite from the first angular direction, from the plane perpendicular to the longitudinal axis.

9. A system according to claim 8 wherein the second groove portion is defined to be offset from the plane perpendicular to the longitudinal axis by a greater degree than the first groove portion.

10. A system according to claim 9 wherein the second groove portion is defined to be offset from the plane perpendicular to the longitudinal axis by an angle that is twice as large as the angle by which the first groove portion is offset from the plane perpendicular to the longitudinal axis.

11. A system according to claim 1 wherein the first, second and third groove portions are disposed sequentially between opposite ends of the circumferential groove such that the first groove portion extends from an end of the circumferential groove to the second groove portion, the second groove portion extends from the first groove portion to the third groove portion and the third groove portion extends from the second groove portion to another end of the circumferential groove.

12. A system to facilitate tying a knot, the system comprising:
a fixture defining an internal passage therethrough, wherein the fixture defines a circumferential groove accessible through an interior surface of the fixture and in communication with the internal passage, wherein the circumferential groove includes first and second groove portions that cross one another;
a supply of a tie member configured to be connected to a lead member that has been fed through the circumferential groove and emerged from the fixture; and
a lead member supply mechanism separate from the supply of the tie member, the lead member supply mechanism configured to alternately feed the lead member through the circumferential groove and to withdraw the lead member from the circumferential groove once the tie member is connected to the lead member,
wherein the circumferential groove further includes a third groove portion parallel to the first groove portion, wherein the second groove portion crosses both the first and third groove portions, and wherein the first, second and third groove portions are disposed sequentially between opposite ends of the circumferential groove such that the first groove portion extends from an end of the circumferential groove to the second groove portion, the second groove portion extends from the first groove portion to the third groove portion and the third groove portion extends from the second groove portion to another end of the circumferential groove, and
wherein a part of the second groove portion that crosses the first and third groove portions has a different depth than the first and third groove portions, but another part of the second groove portion has a same depth as the first and third groove portions.

13. A system according to claim 12 wherein the fixture comprises first and second fixture components that cooperate to define the first, second and third groove portions of the circumferential groove, wherein the first fixture component defines the second groove portion to cross the first and third groove portions and the second fixture component defines the first, second and third groove portions to have a parallel relationship, and wherein the first fixture component defines the first and third groove portions to lie in respective planes that are offset in a first angular direction from a plane perpendicular to a longitudinal axis about which the internal passage is centered and defines the second groove portion to lie in a respective plane that is offset in a second angular direction, opposite from the first angular direction, from the plane perpendicular to the longitudinal axis.

14. A system according to claim 13 wherein the second groove portion is defined to be offset from the plane perpendicular to the longitudinal axis by a greater degree than the first and third groove portions.

15. A system according to claim 12 wherein the circumferential groove comprises a channel and a neck extending between the channel and the interior surface of the fixture, wherein the neck has a smaller width than the channel, and wherein the channel is defined by angled surface that converge to the neck.

16. A system according to claim 15 further comprising a pliable member positioned within the neck.

17. A system according to claim 12 wherein the lead member supply mechanism comprises:
a supply of the lead member; and
one or more rotatable feed members configured to engage the lead member and to alternately feed the lead member to and withdraw the lead member from the circumferential groove.

* * * * *